No. 881,473. PATENTED MAR. 10, 1908.
N. ILLOWAY.
DETACHABLE BUTTON.
APPLICATION FILED APR. 4, 1907.
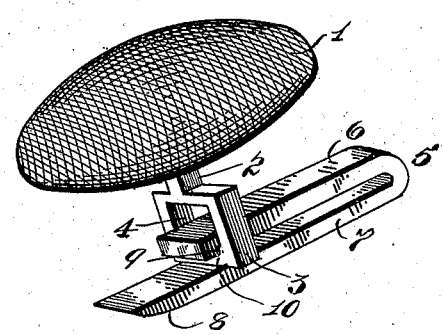
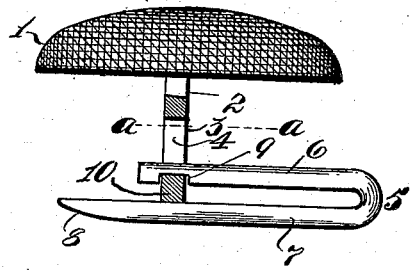
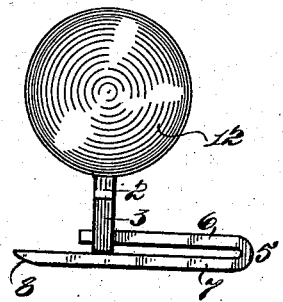
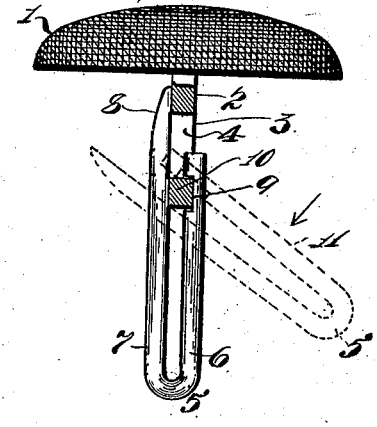
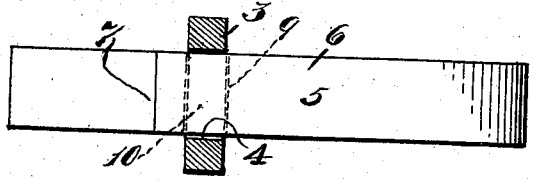
Witnesses:
C. A. Jarvis
Nathan Harris
Inventor:
Nettie Illoway
Attorney
THE NORRIS PETERS CO., WASHINGTON, D. C.

UNITED STATES PATENT OFFICE.

NETTIE ILLOWAY, OF NEW YORK, N. Y.

DETACHABLE BUTTON.

No. 881,473.  Specification of Letters Patent.  Patented March 10, 1908.

Application filed April 4, 1907. Serial No. 366,263.

*To all whom it may concern:*

Be it known that I, NETTIE ILLOWAY, a citizen of the United States, residing at New York city, Manhattan borough, county and State of New York, have invented certain new and useful Improvements in Detachable Buttons, of which the following is a clear, full, and exact description.

This invention relates to buttons, particularly to that class known as detachable buttons, the object of the invention being to produce a detachable button which can be cheaply made, at the same time be durable, and reliable in action.

To these and other ends which will hereinafter appear, my invention comprises the novel features of improvement and combination and arrangement of parts which will hereinafter be described and finally claimed.

In the accompanying drawing, which forms part of this specification,—Figure 1 is a perspective view of a button embodying my improvements; Fig. 2 is a side elevation, partly in section, of my improved button, showing the tongue closed; Fig. 3 is a similar view, showing the tongue extended and ready for insertion; Fig. 4 is an enlarged sectional plan view, the section being taken on a line *a—a* in Fig. 2; and Fig. 5 is a side elevation of a different form of the button-head having my improvement attached thereto.

Similar characters of reference indicate corresponding parts in all the views.

Referring to the drawing, the numeral 1 indicates a button-head of any desired configuration, or design, the form herein illustrated being arbitrary. To the button-head 1, I secure in any suitable manner a shank or support 2, which terminates in an enlargement or box formation 3, said enlargement having a central opening 4. In conjunction with the shank or support 2 I use a tongue 5, of resilient material which is composed of the members or arms 6 and 7, the member or arm 7 being the longer and extending considerably beyond the shank 2, and being tapered as shown at 8. The short member or arm 6 has a notch or recess 9 formed therein, which is adapted to receive the lower bar 10 of the enlarged portion 3. When the tongue 5 is in position, the members or arms 6 and 7 having been made to engage the square bar 10, the notch 9 and said bar 10 will form a mortise-like connection, the recess 9 being slightly wider than the said bar 10 in order to permit of a free movement. As will be seen in Fig. 4, the tongue 5 is slightly narrower than the opening 4, the difference in width having been exaggerated for clearness of comprehension. The members or arms 6 and 7 of the tongue 5 are designed to firmly grasp the bar 10 by spring tension, or a tendency to close, and when manipulating the tongue 5 the said members or arms 6 and 7 will always exert this tension, whereby premature movement, to a large extent, is obviated. When the extension 8 comes in contact with the shank 2, the arm 7 will be adapted for insertion into a garment (see Fig. 3), the resilient action of the members 6 and 7, together with the recess 9 in member 6, also aiding to keep said arm 7 in a vertical position.

It will be seen by the dotted lines 11 Fig. 3 that when the tongue 5 is being manipulated to bring it to a position for insertion through an opening or button-hole in direction of the arrow Fig. 3, the arms 6 and 7 will spread, but will, by spring action, return to their normal position when the tongue is vertical, or in parallelism with the sides of the shank or support 2. This same action will take place when the tongue 5 is manipulated in the opposite direction. I prefer to make the shank of my improved button of square section, and the box 3 of considerable width in order that the tongue 5 will not have any transverse rotary movement in the opening 4. The purpose of this style of button is too well known for detailed description, but it may here be stated that my improved holding device is applicable for any style of button-head, such as are used for cuffs, vests, ladies' waists or for any analogous purposes. It is obvious that my improved button is intended for use in articles provided with openings or in which openings can be made.

Having now described my invention what I claim and desire to secure by Letters Patent is:

1. A detachable button, consisting of a head, a shank carried thereby having an enlarged portion provided with an opening, a movable tongue comprising a plurality of resilient members, one of said members being provided with a recess in the inner side adapted to engage said shank at the bottom of the opening therein, the other of said members being adapted to contact the under side of said shank and hold said recessed member in position.

2. A detachable button, consisting of a head, a shank carried thereby having an enlarged portion provided with an opening, a movable tongue comprising a plurality of resilient members, one of said members having a recess in the inner side adapted to engage said shank at the bottom of the opening therein, the other of said members being adapted to contact the under side of said shank and hold said recessed member in position, one of said members being provided with an extension adapted to maintain said tongue in extended position.

3. A detachable button, consisting of a head, a shank carried thereby provided with an opening, said opening being so formed as to leave a substantially square bar at the bottom thereof, a movable tongue comprising a plurality of resilient members, one of said members being provided with a recess adapted to engage said bar when said bar is in a horizontal or extended position, said recessed member being held in position by the resiliency of the other of said members.

Signed at New York city, N. Y., this 3d day of April, 1907.

NETTIE ILLOWAY.

Witnesses:
 LILLIAN HARRIS,
 EDWARD A. JARVIS.